United States Patent [19]

Friedman

[11] 4,020,498

[45] Apr. 26, 1977

[54] PHOTOGRAPHIC FLUID PROCESSING APPARATUS

[75] Inventor: Harvey S. Friedman, Natick, Mass.

[73] Assignee: Polaroid Corporation, Cambridge, Mass.

[22] Filed: Nov. 28, 1975

[21] Appl. No.: 636,084

[52] U.S. Cl. .................................. 354/86; 354/304

[51] Int. Cl.[2] .......................................... G03B 17/50

[58] Field of Search .................. 354/83, 84, 85, 86, 354/301, 303, 304

[56] References Cited

UNITED STATES PATENTS

| | | | |
|---|---|---|---|
| 3,647,441 | 3/1972 | Bachelder | 354/86 |
| 3,766,842 | 10/1973 | Whall | 354/304 |
| 3,776,118 | 12/1973 | Driscoll | 354/304 |
| 3,779,144 | 12/1973 | Paglia | 354/304 |
| 3,829,871 | 8/1974 | Gold | 354/86 |
| 3,854,809 | 12/1974 | Driscoll | 354/86 |
| 3,864,703 | 2/1975 | Gold | 354/86 |
| 3,871,010 | 3/1975 | Whall | 354/86 |
| 3,877,042 | 4/1975 | Douglas | 354/86 |
| 3,925,800 | 12/1975 | Whall | 354/86 |

*Primary Examiner*—Monroe H. Hayes
*Attorney, Agent, or Firm*—Francis J. Caufield

[57] ABSTRACT

A fluid processing apparatus adapted to spread a processing fluid over a predetermined photosensitive area of a photographic film unit. The film unit includes a first image-recording sheet element that is secured in superposed face-to-face relation with a second image-receiving sheet element. The sheet elements are held together in this relationship by an external binding that is secured to the surfaces of the sheets and overlaps their longitudinal and lateral edges to define, in part, an exposure area of the film unit; the film unit thus arranged is adapted to be processed to produce a visible image as a processing fluid is distributed across the image-recording sheet element coextensive with the exposure area. The fluid processing apparatus includes a pair of rotatably mounted juxtaposed pressure applying rollers that are resiliently urged toward one another and are adapted to receive the film unit and spread the processing fluid between the sheet elements as it is advanced between the rollers. At least one of the rollers includes a pair of asymmetrically spaced apart grooves which receive the longitudinal margin portions of the film unit when it is advanced between the rollers of the processing apparatus. The film unit is advanced from an exposure station by the application of an asymmetric force at the corner of its trailing edge. Thus advanced, the film unit approaches the rollers with its leading edge canted with respect to a plane in which the rollers are mounted. The asymmetrically spaced apart annular grooves compensate for the canted attitude of the film unit in order to insure that the processing fluid is properly spread over the exposure area.

3 Claims, 11 Drawing Figures

FIG. I

PHOTOGRAPHIC FLUID PROCESSING APPARATUS

BACKGROUND OF INVENTION

1. Field of the Invention

This invention relates to photography and, more particularly, to a fluid spreading apparatus for use with a film unit of the self-processing type.

2. Description of the Prior Art.

Fully automatic photographic systems for use with self-processable type films are well known in the photographic field and have been extensively described in the patent literature. These systems, such as Polaroid Corporation's "SX-70," are designed to automatically produce finished, waste-free photographs following their actuation. They accomplish this task through the use of a system architecture that generally comprises a group of specially designed interdependent function providing sub-systems that are organized to carry out a programmed series of sequential operations that ultimately result in the finished print. The order of operations, following system activation, usually begins with exposure of the film unit at some suitable predetermined location. Then the exposed film unit is advanced from the exposure location into engagement with a processing subsystem or apparatus. The function of the processing apparatus is generally twofold: to transport the film unit to the exterior of the system where it is accessible to the user and to spread a processing fluid across a selected photosensitive layer of the film unit during its transportation. The function of the processing fluid in this connection is to effect a diffusion transfer process that chemically transforms the latent image contained in the exposed photosensitive layer to a visible one, the final photographic image. It has been found that the quality of the final image generated by the diffusion transfer process is a critical function of the thickness distribution of the processing fluid over the photosensitive layer of the film unit. Consequently, the dominant concern in the design of every transport and processing system is to assure that the thickness distribution of the layer of processing fluid meets minimum requirements consistent with high quality of the final image. Naturally, this is achieved only through an understanding of all those parameters which may have an influence in processing performance.

In general, the present invention has this overriding concern but is particularly concerned with providing processing hardware solutions that are aimed at eliminating undesirable processing problems that can arise as a result of particular detailed interactions that take place between the film advancing subsystem, the processing apparatus, and the film unit during the transport and processing stage.

To be more specific, when the film unit is advanced from its exposure location in these fully automatic systems, it is usually advanced by a picking arrangement which engages its trailing edge on one side to provide a force to move it toward the processing apparatus. (See, e.g., U.S. Pat. No. 3,709,122). Because of the application of this asymmetric force, it has been observed that the film unit is engaged by the processing apparatus with its leading edge canted. Moreover, it has also been observed that it maintains this canted attitude throughout the processing stage. This canting is apparently the source of certain fluid coverage problems.

One of the problems that has been associated with the canting has been an incomplete coverage of the processing fluid over the picture area of the film unit. This has been particularly noticeable on the picking side near the corner of the read edge. It has been theorized that the canting may give rise to a lateral force component that causes the processing fluid to flow to the non-picking side. The prior art disclosed a remedy for this particular problem in the form of a processing roller having a reduced end diameter on the picking side. The reduced end diameter caused a reduction in the thickness of the processing fluid on the picking side so that its coverage capability was extended thereby eliminating the tendency toward incomplete corner coverage (see, e.g., U.S. Pat. No. 3,854,809).

Another problem associated with the canting has been an overall reduction in the thickness of the processing fluid layer near the picking side. This tendency is highly undesirable because of the requirement of thickness uniformity. And, in addition, the reduced end diameter roller solution seems inconsistent with eliminating this latter problem.

Because the one-sided picking arrangement is convenient for other reasons, the solution to both of these processing problems is preferably resolved by retaining the picking arrangement and looking elsewhere for a solution. There is, therefore, a need for a processing apparatus that can handle the canted film unit while eliminating the aforementioned processing problems.

The present invention approaches this problem by recognizing that the canting is the source of the problems but goes further by examining what can be done to influence the detailed interactions between the canted film unit and the processing appartus to obviate these problems.

SUMMARY OF THE INVENTION

In its illustrated embodiment, the present invention is depicted as a fluid processing apparatus, preferably forming an integral part of a fully automatic camera system for use with a self-processable waste-free film unit. The film unit comprises a first image-recording sheet element secured in superposed face-to-face relation with a second image-receiving sheet element. The sheet elements are held together in this fashion by an external binding that is secured to their non-facing surfaces and overlaps the longitudinal and lateral edges of the sheet elements to define, in part, an exposure area of the film unit; the film unit is adapted to be processed to produce a visible image as a processing fluid is distributed, preferably, between the sheet elements at least coextensive with the exposure area.

In its preferred embodiment, the fluid processing apparatus comprises a pair of juxtaposed pressure applying rollers that are rotatably mounted between a pair of spaced apart support members and are continuously urged toward one another by a resilient biasing means. The support members include elongated slots which facilitate translatory motion of one of the rollers with respect to the other. Spaced apart annular collars are provided adjacent opposite ends of one of the rollers and extend to contact respective bearing surfaces on the other roller to define a minimum spacing between the rollers when under the influence of the resilient urging means; the minimum spacing facilitating the introduction of the film unit between the rollers. The invention, thus arranged, is particularly adapted to spread the processing fluid between the sheet elements of the film unit as it is advanced between the rollers. In this respect, one of the rollers has a high friction resilient material to facilitate the advancement of the film unit.

The roller having the resilient material thereon includes a generally rigid support member. Overlying the support member is the layer of high friction resilient material. Formed in the high friction layer is a pair of asymmetrically spaced apart annular grooves. The annular grooves are adapted to receive a correspondingly spaced apart pair of longitudinal margin portions of the film unit when it is brought into engagement with the rollers.

The film unit is advanced towards the rollers by the application of an asymmetric force at one of its rear corners. This force is initially applied with the film unit located at an exposure station and continues while the film unit moves along its line of advancement until brought into operative relationship with the processing apparatus. Because of the asymmetry of the force that moves the film unit toward the processing apparatus, the film unit approaches the rollers of the processing apparatus with its leading edge canted with respect to a plane containing the axes of rotation of the rollers. This canted orientation of the film unit, as it approaches the rollers, would normally cause a misalignment between the annular grooves and the longitudinal margin portions of a film unit that was intended to enter the annular grooves in a symmetric fashion. The asymmetrically spaced apart annular grooves of the present invention compensate for this canted orientation of the film unit in order to assure that the processing fluid is properly spread across its exposed area.

The resilient layer of high friction material preferably comprises a suitable elastomer as, for example, urethane, and the relatively rigid support member preferably comprises a carbon or stainless steel.

An object of this invention, therefore, is to provide an improved fluid processing apparatus of the film advancing type.

An additional object of the present invention is to provide a fluid processing apparatus having improved effectiveness and reliability at a reduced cost.

BRIEF DESCRIPTION OF THE DRAWINGS

The novel features that are considered characteristic of this invention are set forth with particularly in the appended claims. The invention itself, however, both as to its organization and its method of operation, together with other objects and advantages thereof, will best be understood from the following description of the illustrated embodiment when read in connection with the accompanying drawings wherein like members have been employed in the different figures to denote the same parts and wherein:

FIG. 7 is a top view of the film unit of FIG. 3 illustrating its orientation with respect to a roller assembly forming part of a fluid processing sub-assembly and also the incomplete corner coverage problem that the present invention is concerned with;

DESCRIPTION OF THE PREFERRED EMBODIMENT

Figure 2:
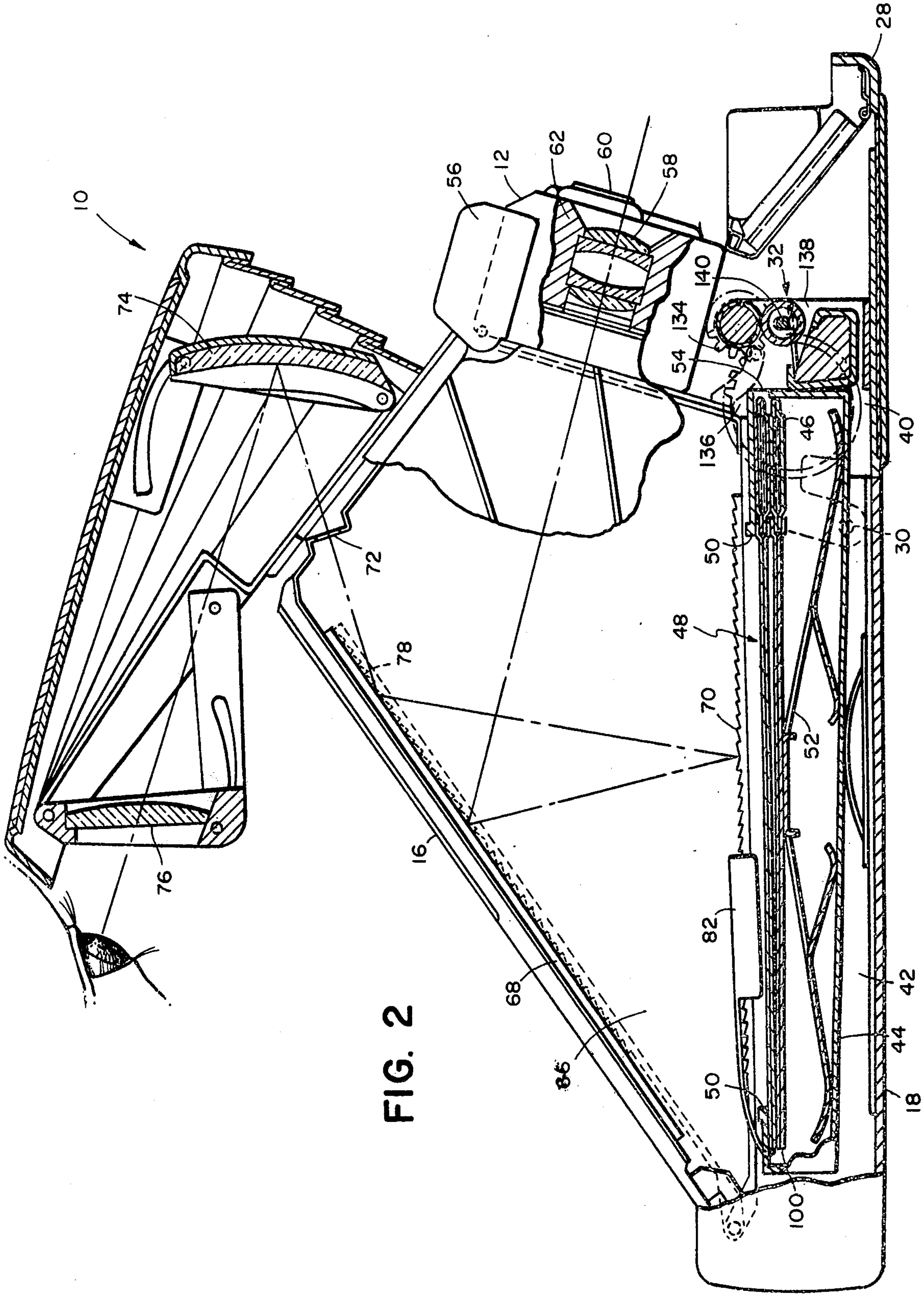
FIG. 2 is a diagrammatic, partially cut-away, side elevational view of the camera system shown in FIG. 1 including a cassette of self-processable type film units.
Figure 3:
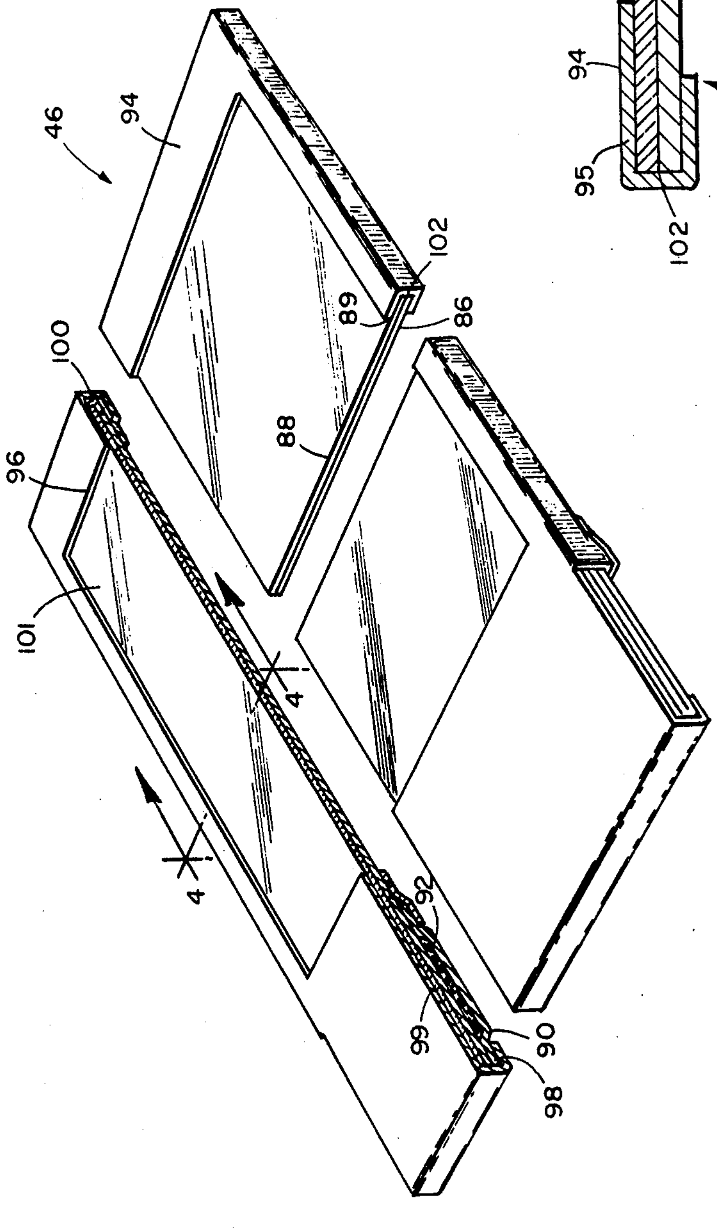
FIG. 3 is a sectioned diagrammatic perspective view of a self-processable film unit contained in the cassette shown in FIG. 2.

In its illustrated embodiment, the present invention is depicted as being incorporated in a subsystem of a compact collapsible fully automatic camera system 10 (FIG. 1) for use with a self-processable film unit like the one shown, for example, in FIG. 3. The camera system 10 generally conforms to the camera structure disclosed and described in considerable detail in U.S. Pat. No. 3,714,879, entitled "Reflex Camera" by Edwin H. Land et al. The system 10 is illustrated in its operative condition in FIG. 1. Referring now to that figure, it can be seen that the system 10 includes a plurality of housing members 12, 14, 16, and 18 that are pivotally connected to one another at pivots 2, 22, 24, and 26 for relative movement between the extended operative condition of FIG. 1 and a compact collapsed condition (not shown). In addition, a fluid processing subassembly 28 extends in front of the housing member 18 and is pivotally connected thereto at a pivot 30 for movement in a clockwise direction as viewed in FIG. 2. The subassembly 28 includes means for mounting a roller assembly 32. The roller assembly 32 includes a pair of juxtaposed spread rollers, 34 and 36, that are continuousy urged toward one another by resiliently biasing means. The present invention is generally concerned with the nature of the roller assembly 32 and, in particular, with the characteristics of its spread rollers, 34 and 36.

Figure 1:
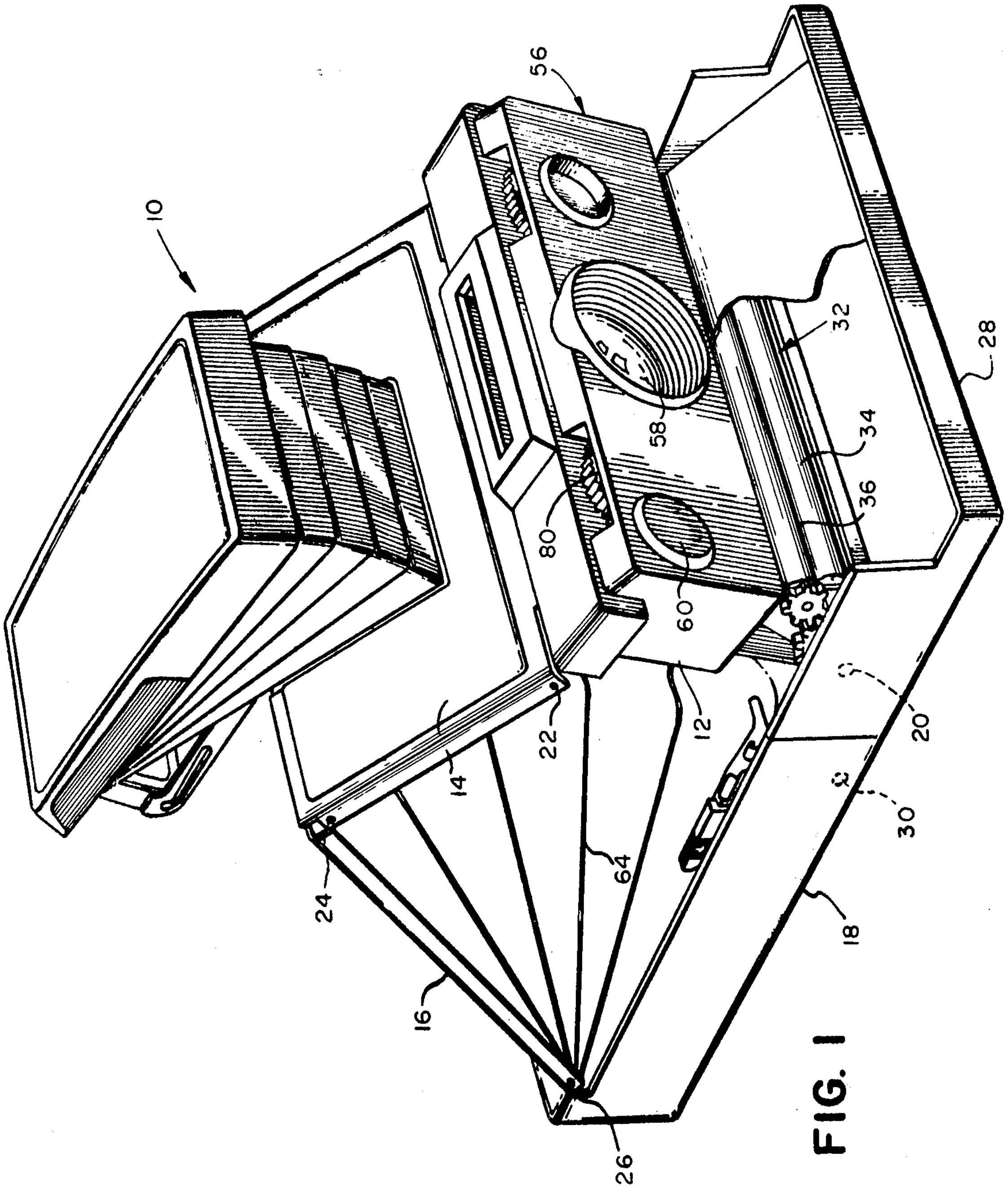
FIG. 1 is a perspective view diagrammatically depicting a collapsible camera system for use with self-processable type film, the system being disposed in its operative state and incorporating the present invention.

When the camera system 10 is disposed in its extended operative condition shown in FIGS. 1 and 2, the roller assembly 32 is disposed across an entrance 40 to a film cassette chamber 42. The pivotal connection between the housing member 18 and the subassembly 28 permits the latter to be rotatably moved with respect to the former to move the roller assembly 32 from its blocking position across the entrance 40 to create access to the film cassette chamber 42 so that a film cassette 44 may be loaded therein.

Each film cassette 44 includes a plurality of film units 46 which may take any suitable form but will generally have a form elaborated on hereinafter. Additionally, each such film cassette 44 is provided with a picture framing aperture 48, not shown in full, but defined in part by longitudinal edge portions 50 of film cassette 44. When the film cassette 44 is properly located within the film cassette chamber 42, the framing aperture 48 becomes positioned so that it is aligned with the optical system of the system 10 in order to facilitate exposure operations and picture framing. Within the film cassette 44 is a spring assembly 52 that continuously urges the film units 46 toward the framing aperture 48 so that an outermost film unit is located in the focal plane of the camera system 10 for purposes of exposing it. An elongated slot 54 is provided in a forward wall of the film cassette 44 to facilitate the advancement of each film unit 46 from the cassette towards the roller assembly 32 after its exposure.

The housing member 12 comprises a housing 56 for a system lens assembly 58, an actuator button 60, and a shutter assembly 62, not shown in detail, but disposed within the housing 56 and comprising suitable electro-optical-mechanical means for determining and regulating exposure intervals. Additionally, housing member 12, in cooperation with members 14, 16, 18, and a collapsible bellows 64 (FIG. 1), forms a six-sided exposure chamber 66.

The optical system of system 10, in addition to the lens assembly 58, further comprises optical means that cooperate with the lens assembly 58 to provide a pair of alternate folded light paths which light rays emanating from the scene and passing through the lens elements of the lens assembly 58 may follow. The nature of these light paths and the associated means for producing them may best be understood by relating them, respectively, to the modes of operation of system 10 while in its extended operative condition. These operational modes may be conveniently classified in functional terms as the viewing and focusing mode and the exposing and processing mode.

In the viewing and focusing mode an image of the scene is brought to the user's eye when rays from the scene pass through the lens elements of the lens assembly 58 and are then reflected off of a fixed mirror 68 which is located on the interior wall of the housing member 16. These light rays are then received by a Fresnel mirror 70, located immediately above and overlying the focal plane of the system 10, that redirects them in a focused bundle of rays and then projects them back to the mirror 68 and then through a small exit hole 72 onto an aspheric mirror 74. From the aspheric mirror 74 the light rays then pass through a magnifying eyeglass 76 which facilitates viewing the scene.

During the exposure-processing mode, the Fresnel mirror 70 is displaced from its position overlying the focal plane of the system 10 to a position immediately adjacent to and overlying the fixed mirror 68. On the reverse side of the Fresnel mirror 70, shown in phantom in FIG. 2, is seen a plane mirror 78, rigidly attached to a carrier common with the Fresnel 70, which reflects light rays coming in through the lens assembly 58 directly onto the surface of the film unit 46.

This unique arrangement of optical elements provides the system 10 with a single lens reflex capability that permits the user to select the subject matter of the scene and subsequently focus it for best image sharpness. He accomplishes this by rotating a focus wheel 80 (FIG. 1) which is located in the housing member 56. When rotated, the focus wheel 80 causes selected elements of the lens assembly 58 to be displaced in a forward-rearward fashion to change the focal length of the lens assembly 58 and hence permit the user to adjust the sharpness of the subject matter image.

To initiate the exposing and processing mode of operation of the system 10, the user simply depresses the actuator button 60. Depression of the actuator button 60 engages control means, not shown, which effect a sequential series of system operations that ultimately result in a finished, waste-free photographic print. The first of these operations closes the normally open shutter assembly 62 which is located in the housing 56. Closure of the shutter assembly 62 provides an internal lighttight condition in the exposure chamber 66. Subsequently, the Fresnel 70 moves from its position covering the focal plane of the system to its position shown in phantom in FIG. 2, thereby uncovering an uppermost one of the photosensitive film units 46. When in this position, the mirror 78 directs light rays coming from the focused subject matter to the film unit 46. Shutter assembly 62 then reopens and the exposure begins. After an appropriate exposure interval the shutter assembly 62 again closes, and the exposure chamber 66 is again in a lighttight condition. At this time the Fresnel 70 is automatically repositioned to cover the exposed film unit and return the exposure chamber 66 to its initial state.

While the Fresnel 70 is returning to its initial position covering the system's focal plane, a sequence of events is initiated to automatically advance the exposed film unit 46 through the elongated exit slot 54 and into operative relationship with the roller assembly 32. As the exposed film unit 46 is passing through the elongated exit slot 54, the shutter assembly 62 then reopens and the system 10 is returned to its viewing and focusing mode.

How the film unit 46 is advanced, and the interactions between it and the roller assembly 32 during its advancement are the particular concern of the present invention. In order to fully appreciate what these interactions are it will first become necessary to become acquainted with the structure and nature of these two assemblies and then to examine the interaction between them in view of the fluid processing and film advancing requirements of the system.

To briefly summarize, after the film unit 46 is exposed, it is brought into engagement with the roller assembly 32, is continually advanced by and through the rollers thereof and, during advancement, is subjected to a compressive force which progressively spreads the processing fluid between selected layers thereof.

The nature and structure of the film unit 46 will now be taken up. As shown in FIG. 3 the film unit 46 comprises a first rectangular photosensitive image-recording sheet element 86 located in superposed relation with a second rectangular image-receiving sheet element 88; sheet element 88 being longer than sheet element 86 by a distance at least equivalent to the width of a pressure rupturable container 90 containing a processing fluid 92. Container 90, or the "pod" as it is often called, is mounted adjacent a leading edge 98 of the image-recording element 86 and underlying an extended portion 99 of the image-receiving element 88. The container 90 is positioned in this fashion so that its fluid contents may be easily discharged between the elements 86 and 88 when subjected to compressive pressure. The processing fluid 92 is distributed between the elements 86 and 88 by virtue of its being moved between the rollers of the assembly 32 which are continuously exerting a compressive pressure on the surface of the elements 86 and 88 while being advanced between them. In order to facilitate the proper distribution of the fluid composition 92 while at the same time aiding in its confinement within the film unit 46, out of contact with other system components and the system user, the processing fluid 92 preferably is somewhat viscous.

Elements 86 and 88 are secured in superposition by a binding 94 which serves to define an exposure area 101, retain the lateral edges of the elements in face to face contact while under compressive load, and facilitate an integrated waste-free film unit.

In order to facilitate exposure and aid in viewing the final picture, the image-receiving element 88 is transparent. This allows actinic radiation to pass through it and be received by the image-recording element 86. In addition, after the final image is formed the user may directly view the picture through this transparent sheet.

Figure 4:
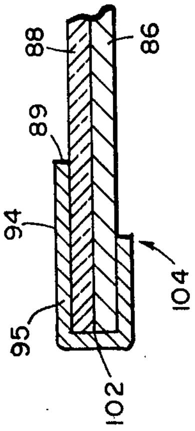
FIG. 4 is a cross-sectional elevation taken along line 4—4, of the film unit in FIG. 3.

An aperture 96 has been provided in the binding 94 in order to limit the area of the image-recording element 86 that will be exposed when subjected to actinic radiation. From its position on the surface of the image-receiving element 88, defining the lateral edges of the exposure area 101, the binding 94 extends outwardly towards the leading edge 98, toward a trailing edge 100, and toward longitudinal edges 102. The binding 94 overlaps all these edges and is then secured to the external surface of the image-recording element 86 extending inwardly along this surface to define longitudinal margin portions 104 which are of greater thickness than the portions of the film unit 46 intermediate the longitudinal edges 102 adjacent the exposure area 101. More specifically, the cross-section of the film unit 46, as a result of this binding technique, is variable as illustrated in part in FIG. 4 where the longitudinal margin portions 104 may be visualized as being a pair binders 95 that overlap the longitudinal edges 102 of the sheet elements 86 and 88 and attach, respectively, to the surfaces of the sheet elements 86 and 88. The inward extension of the binding 94 on the external surface of the element 88 measured from a lateral edge 89 to the longitudinal edge 102 is greater than the inward extension of the binding on the surface of the element 86 when measured from the longitudinal edge 102 to the edge of the binding.

Although this binding technique serves the requirements discussed above, it introduces a problem in distributing the processing fluid 92 in a region 103 (see FIG. 5) adjacent the lateral edges 89 of the exposure area 101 as the fluid 92 is spread in a longitudinal direction from the leading edge 98 to the trailing edge 100 of the film unit 46.

Figure 5:
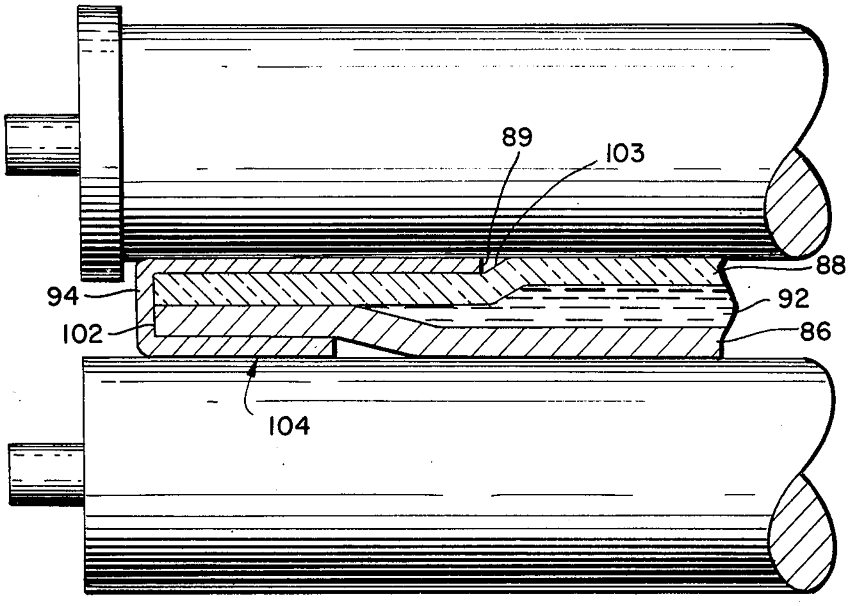
FIG. 5 is a diagrammatic elevation showing a partially broken away cross-section of the film unit of FIG. 3 disposed between a pair of rollers not comprising the rollers of the present invention.

The problem of distributing the processing fluid in the region 103 is clearly illustrated by referring to FIG. 5 and assuming, for purposes of illustration only, that the pressure applying spread rollers of the roller assembly 32 are straight cylinders resiliently biased toward one another. It is apparent that during the spreading of the processing fluid 92 the rollers of FIG. 5, under this assumption, will retain the sheet elements 86 and 88 in face to face relationship in the region of longitudinal edge portions 104 while permitting the medial portions of the elements in the region of the exposure area 101 to separate under the influence of the hydraulic pressure of the processing fluid 92 until the external surfaces of the sheet elements 86 and 88 come into contact with the sheet contacting surfaces of the rollers. Under these conditions, the thickness of the processing fluid in the medial portions of the exposure area 101 will be approximately equal to twice the thickness of the binding 94 but, as can be seen in FIG. 5, in the region 103 there will exist a fluid layer transition thickness where the fluid thickness ranges from twice the thickness of the binding 94 to a single thickness. This is obviously caused by local geometric constraints in the region 103. The result of these constraints is an insufficient amount of processing fluid adjacent the lateral edges 89 thereby causing unacceptable image formation. This condition is aggravated by processing fluid absorption in adjacent regions further reducing the quantity of fluid available to process the exposed photosensitive image-recording element 86. The solution to this problem of insufficient fluid at the lateral edges 89 is to permit further lateral expansion to occur between the sheet elements 86 and 88 in the region underlying and between the inward extensions of the binding 94 on the external surfaces of the sheet elements 86 and 88. This can be achieved by providing a recess in the form of an annular groove in one of the rollers. The depth of the recess preferably equals the thickness of the binding 94. The location of the annular grooves preferably overlie the region where the expansion is required. This solution has been chosen and is presently available in commercial apparatus for use with film units of the type described herein.

Figure 6:
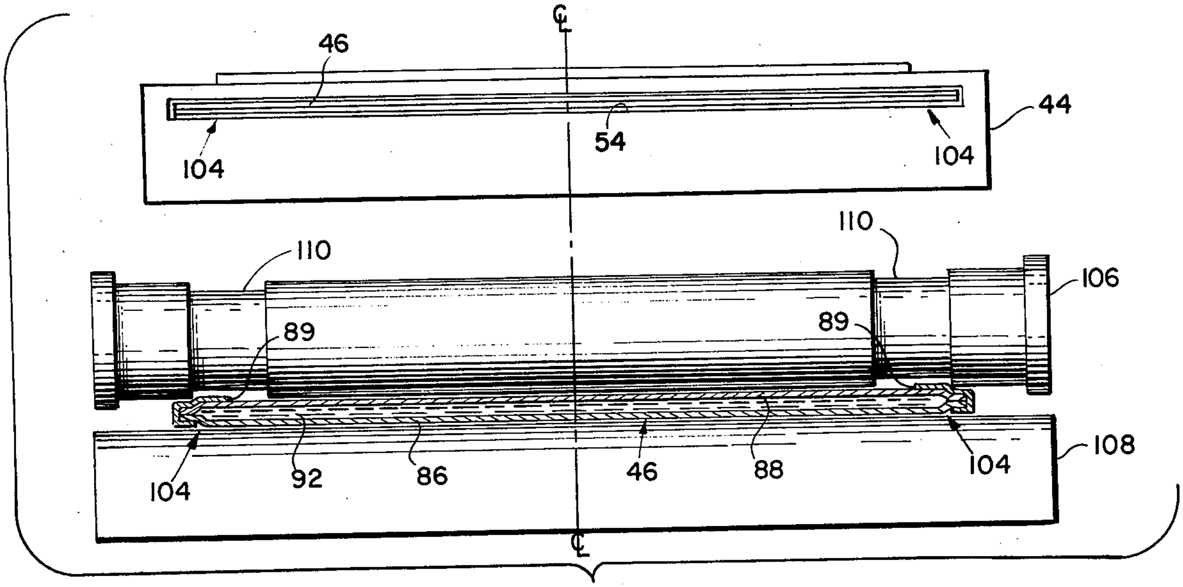
FIG. 6 is a front elevational view illustrating a perfect spatial orientation between the cassette of FIG. 2, the film unit of FIG. 3, and a pair of rollers forming part of a roller assembly.

This solution, using the annular grooves in one of the rollers to correct this insufficient fluid problem, is illustrated in FIG. 6.

FIG. 6 shows a cross-section of the film unit 46 disposed between a pair of juxtaposed rollers 106 and 108 that are also resiliently biased toward one another. The top roller 106 includes a pair of symmetrically spaced apart annular grooves 110, while the bottom roller 108 is a straight cylinder. It can be seen that the thickness of the processing fluid 92 between the lateral edges 89 of the binding 94 is of uniform thickness without the thickness transition problem previously described with reference to FIG. 5. It will be recalled that the distance between the lateral edges 89 corresponds to the picture area. The annular grooves 110 consequently insure a uniform distribution of the processing fluid 92 across this area. Since the uniform distribution of the processing fluid 92 across the picture area is highly desirable for proper image formation, it is seen that the annular grooves are quite effective in bringing about this condition. It should further be noted with reference to FIG. 6 that the thickness of the processing fluid 92 is approximately equal to twice the thickness of the binding 94. However, the gap separating the two rollers is determined by the total thickness of the longitudinal margin portions 104. The longitudinal margin portions 104 in this connection act as a pair of rails or bearing surfaces over which the rollers exert a compressive force. This condition is more graphically portrayed in the exploded view of FIG. 8.

Although the annular groove solution is quite effective in eliminating the insufficient processing fluid problem near the region 103, it assumes that the film unit 46, and especially the longitudinal margin portions 104, will always be symmetrically disposed within the annular grooves. In other words, the center line of the film cassette 44, and thus the longitudinal centerline of each film unit when the cassette is loaded into the film cassette chamber 42, is assumed to line up perfectly with the center line of the roller assembly 32 when it is in its blocking position in readiness to receive one of the film units 46. The film units when in the cassette chamber 44 are thus symmetrically arranged with respect to a line (not shown) contained in the cassette chamber 44 that is coincident with the longitudinal centerline of each film unit. This is illustrated again in FIGS. 6 and 8. It will be noted in those figures that everything is equally spaced about the common centerline. In practice, however, this assumption does not hold true because of the manner in which the film unit 46 is advanced from the film cassette 44 into engagement with the roller assembly 32.

Figure 7:
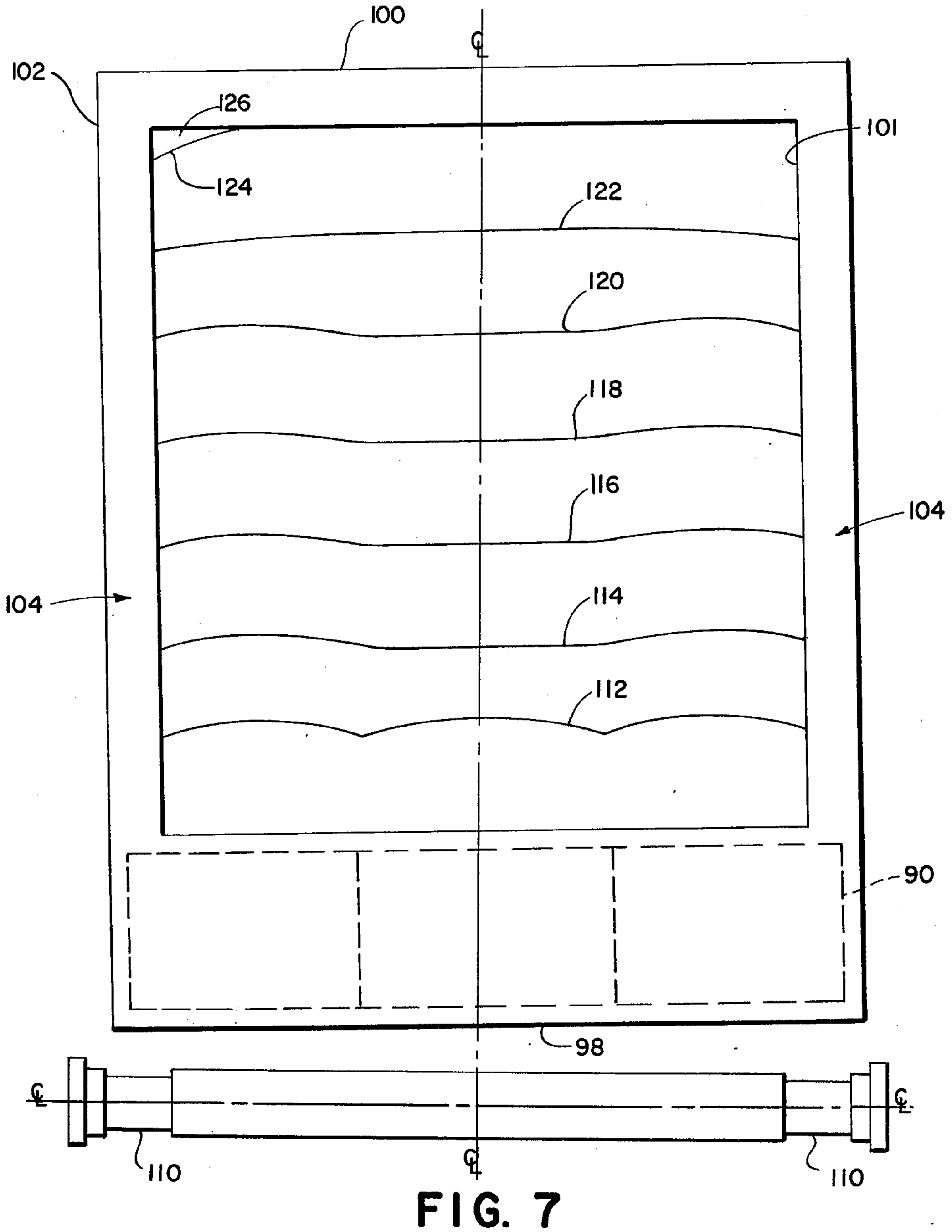

How this assumption of absolute symmetry between the film cassette 44, the roller assembly 32 and the film unit 46 is destroyed may best be understood by referring to FIG. 2, which illustrates the film advancing mechanism, and FIG. 7, which illustrates the alignment of the film unit 46 with the roller assembly 32 just prior to the film unit's being brought into engagement with the roller assembly 32.

In FIG. 2 it can be seen that the film unit 46 is advanced out of the film cassette 44 via the elongated exit slot 54 by a film picking mechanism 82 that engages the trailing edge 100 of the film unit 46 to apply a pushing force to it to move it along the path previously described. Motion is imparted to the picking mechanism 82 by a suitable camera motor and gear train assembly which is not shown.

Figure 9:
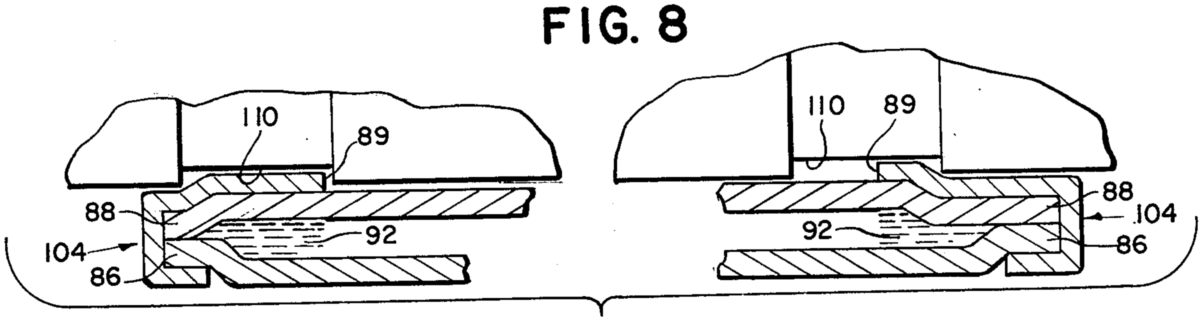

Because the film picking mechanism 82 applies the pushing force along only one side of the film unit 46 (along the gear train side), it creates a lateral force which biases the film unit 46 toward the non-gear train side of the system 10. The effect of this lateral force is to move the film unit 46 toward the roller assembly 32 with its leading edge 98 canted at a predetermined angle to the line of the cassette chamber 44 about which the film units are initially symmetrically arranged. This line is coincident with the centerline of the rollers as shown in FIG. 7, the gap between the rollers being normal to the cassette center line when it is disposed within the cassette chamber 44. Because the film unit 46 enters the roller assembly 32 in this canted fashion, the longitudinal margin portions 104 of the film unit 46 no longer enter the annular grooves 110 with equal spacing with respect to the common centerline between the cassette 44 and the roller assembly 32. This condition is illustrated in FIG. 9. As a result of the asymmetric alignment of the longitudinal margin portions 104 within the annular grooves 110, new processing fluid coverage problems are introduced. One of these problems is illustrated in FIG. 7.

In FIG. 7 there are a series of lines 112, 114, 116, 118, 120, 122, and 124 approximately equally spaced over the picture area 101 and oriented transverse to the direction of travel of the film unit 46 through the roller assembly 32. These lines represent the wave front of the processing fluid 92 at approximately equal intervals of time during the processing stage. What is most significant, at least for purposes of the present invention, is an area 126 which exists just beyond the terminal point of the last wave front 124. This area 126 represents the aforementioned processing fluid problem. It can be seen that the area 126 is located in a corner formed adjacent the trailing edge 100 and the longitudinal edge 102 along the gear train or picking side of the film unit 46. Hence, the problem is referred to as being one of incomplete corner coverage. It is obvious that the incomplete corner coverage is created as a result of insufficient fluid being available when the film unit reaches that position. What is not obvious, however, is why this insufficiency exists. What is known is that it is clearly related to the asymmetric alignment of the film unit 46 with the roller assembly 32. One of the prior art Patents reasons that, because of the asymmetric alignment, there may be a lateral force created which causes the processing fluid 92 to migrate towards the non-picking side. Because of this lateral force, more of the processing fluid 92 migrates toward that side, thereby making less available for the picking side. In order to solve the problem, under this theory, the prior art reasons that a reduction in the gap separating the rollers on the picking side would thin out the spread along that side and thereby make more fluid available to cover the incomplete corner 126. The prior art accomplished this by reducing the end diameter of the upper roller 106 on the picking side where that diameter contacted the longitudinal margin portion 104. This solution proved to be effective but somewhat complicated the manufacturing of the upper roller since it now had to be fabricated with differing diameters along its sheet contacting surface.

In addition to the incomplete corner coverage problem, there is another fluid processing problem that occurs whenever the film unit 46 is engaged in a canted general thinning of the processing fluid layer on the picking side. This tendency toward a generally thinner processing fluid layer is highly undesirable because of the general requirement for uniformity of thickness of the processing fluid layer. One explanation for the existence of this problem is that the longitudinal margin portions 104 are compressible. The amount of compression being proportional to the area of contact they experience while under the compressive load of the rollers 34 and 36. Since the bearing area is changing because the film is canted, the longitudinal margin portions experience more or less deflection depending on the area under contact. Consequently, the gap separating the rollers is likewise changing thus changing the fluid layer thickness accordingly. The thinner gap on the drive side would therefore imply at least an initial smaller contact area on that side due to the canted film unit. As will be seen, this apparently is the case. In addition, the fact that the binding 94 is capable of deflections of ± 1.2 tenths of an inch for a one pound change in loading from the nominal operating load of 5 pounds, seems to support the changing compressibility view.

The present invention solves both of these problems, the incomplete corner coverage problem, and the thinner layer problem, by taking a different theoretical view of the physics of the processing phase and making a very simple change in the location of the annular grooves with respect to the centerline of the roller assembly 32 and the line of the cassette chamber 44 about which the film units are initially symmetrically arranged. In effect the invention is to laterally shift the location of the annular grooves 110 toward the non-pick side of the upper roller 36 in the roller assembly 32. This makes the annular grooves asymmetric with respect to the common centerline of the film cassette 44 and the roller assembly 32. The effect of this shift in the location of the annular grooves 110 is to change the initial alignment of the longitudinal margin portions 104 as they enter the roller assembly 32 and, of course, their subsequent alignment as well. How the invention works may best be understood by referring to FIGS. 8, 9 and 10.

Figure 8:
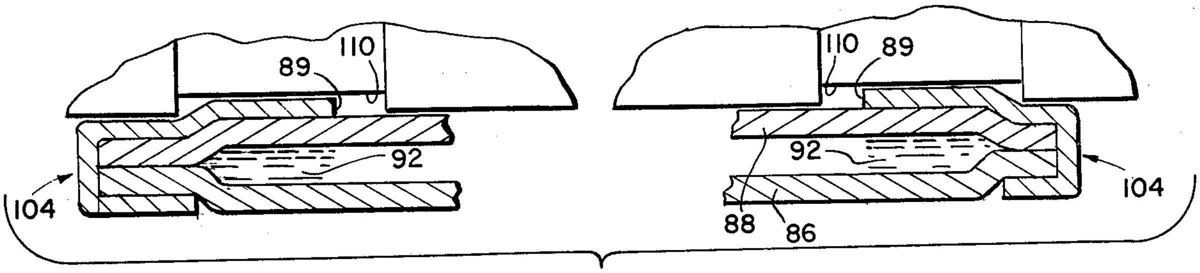
FIGS. 8, 9 and 10 are exploded fragmented views illustrating the lateral edges of the film unit of FIG. 3 when disposed in various orientations within the grooved sections of the top roller of FIG. 6.
Figure 10:
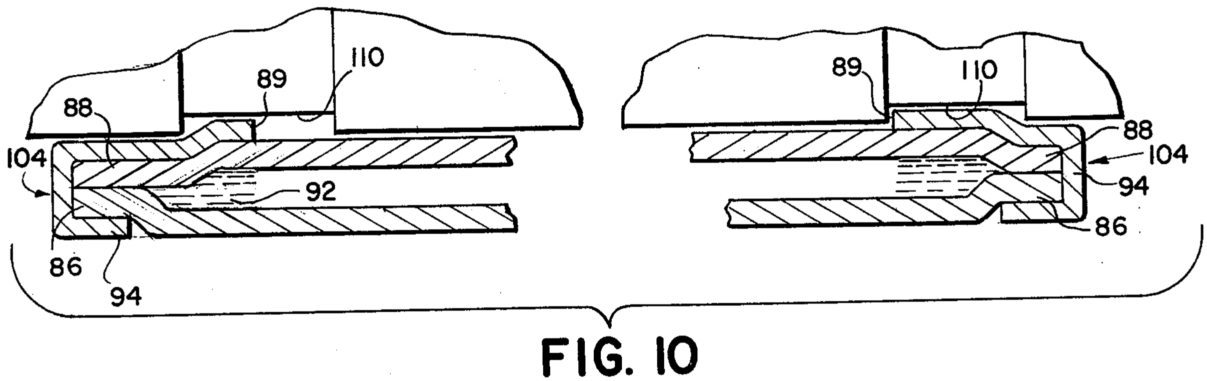

FIGS. 8, 9 and 10 are exploded fragmented cross-sectional views of the longitudinal margin portions 104 disposed within the annular grooves 110 with different alignments. These figures may be thought of as the disposition of the film unit between the rollers of the roller assembly 32 at stations along the line of travel of the film unit 46 during its processing. The three figures would correspond to transverse cross-sections located immediately after a trailing end of the pod 90, a station corresponding to a point located midway into the exposure area 101 and a station corresponding to the terminal point of the exposure area 101 (see FIG. 7). For purposes of explaining how the present invention works, these three figures will be referred to the three locations interchangeably, depending on whether reference is being made to how the present invention works or by contrasting how the present invention works with the prior art.

In the ideal symmetrical situation for perfect fluid distribution, the total volume of fluid that must be contained in the pod 90 can be calculated by taking the cross-sectional area of the fluid 92 as shown in FIG. 6 and multiplying it by the length of the exposure area and adding some additional fluid to account for minor tolerance variations. This is illustrated again in FIG. 8. Essentially then, the volume of the processing fluid 92 that is available for distribution over the exposure area 101 is fixed. What happens in the asymmetric condition is that there is a redistribution of this fluid such that some of it is used up before reaching the incomplete corner area 126. This may be understood by referring to FIG. 9. In FIG. 9 the left side of the drawing shows the amount of fluid located underneath the upper part of the binding 94 between the lateral edge 89 and the intersection of the two sheet members 86 and 88. The right side of the figures shows the corresponding situation on the non-picking side. By comparing the left and righthand portions of FIG. 9 with the left and righthand portions of FIG. 10 and understanding that the film unit enters the roller as shown in FIG. 9 without the asymmetrically spaced apart annular grooves and exits as shown in FIG. 10, it can be seen that the space available under the binding 94 on the pick side increases from a large space as shown in FIG. 9 to a relatively small space as shown in FIG. 10. What this means is that, as the film unit 46 travels through the rollers under these conditions, the amount of fluid migrating laterally into this area is used up more rapidly than it should be. The consequence of this, of course, is that there is a deficit of fluid by the time the film unit 46 exits the roller assembly 32.

Also notice that the bearing area of the longitudinal margin portions 104 on the left side of FIG. 9 is smaller than that on the right side. This would mean that the left side should compress more than the right causing a thinner gap on the left or drive side. This seems inconsistent with an incomplete corner coverage problem since the prior art solution is to thin out the processing fluid layer in order to eliminate this problem. However, both can exist, if the rate at which the processing fluid is used up under the binding 94 exceeds the excess provided by the thinner gap on the drive side. By contrast, the situation on the right side is exactly opposite to what is occurring on the drive side. The area into which the fluid may enter is going from a relatively small area to a relatively large area such that the rate at which fluid is being used up is compensated for because less is being used up initially and is therefore available to fill the larger area that is available at the end of travel. In addition, the bearing area over which the rollers are exerting a compressive force are also changing at variable rates as a function of the position of the film unit between the rollers of the roller assembly 32. Because the bearing area is changing, the gap separating the two rollers is also changing since the longitudinal margin portions are apparently being compressed by virtue of the changing bearing surface area. These phenomena coupled with film orientation within the annular grooves 110 or a combination of them, it is reasoned, contribute to the incomplete corner coverage problem and the thin drive side problem. Thus, it has been discovered with the present invention that the alignment of the longitudinal margin portions 104 within the annular grooves 110 becomes a critical part of the overall process of controlling the distribution of the processing fluid 92 across the exposure area 101. By shifting the position of the annular grooves 110 towards the non-pick side, i.e., toward the right as viewed in FIG. 10, it has been found that the incomplete corner coverage problem can be substantially eliminated and the thickness of the fluid layer on the drive side increased. This situation is illustrated now by assuming that FIG. 10 shows the initial condition of the film unit 46 disposed between the rollers of the roller assembly 32. Here the area under the left side of the binding means is a relatively smaller area compared to the area of the symmetric case of FIG. 10 and further decreases as the film unit is advanced through the rollers. The amount of fluid saved initially in this case on the left side is now available for use towards the trailing end of the film unit 46 as the film unit exits the rollers. In addition, the compressibility effect also provides a more uniform distribution of fluid. Again, the argument is exactly opposite for the right side.

By recognizing the behavior and interaction between the film unit 46 and the annular grooves 110 in the top roller of the roller assembly 32, the incomplete corner coverage problem and the thin drive side problem have been substantially eliminated by asymmetrically spacing the annular grooves 110 about the common centerline between the roller assembly 32 and the film cassette 44.

It is clear that the lateral distance that the annular grooves should be shifted is critical since a shift too far toward the non-pick side may do nothing more than change the location of the incomplete corner coverage. How large the shift should be is a function of, among other things, the particular characteristics of the film unit, the physical characteristics of the processing apparatus such as spring tension, the processing speed, and the angle at which the film unit is canted. The exact distance would therefore be best determined by performing a series of carefully controlled experiments using the specific film unit and hardware. The compressibility of the longitudinal margin portions also apparently plays a major role since it appears there is a need to balance its effect on changing gap against the changing areas under the bindng 94 that is achieved by shifting the annular grooves 110.

Figure 11:
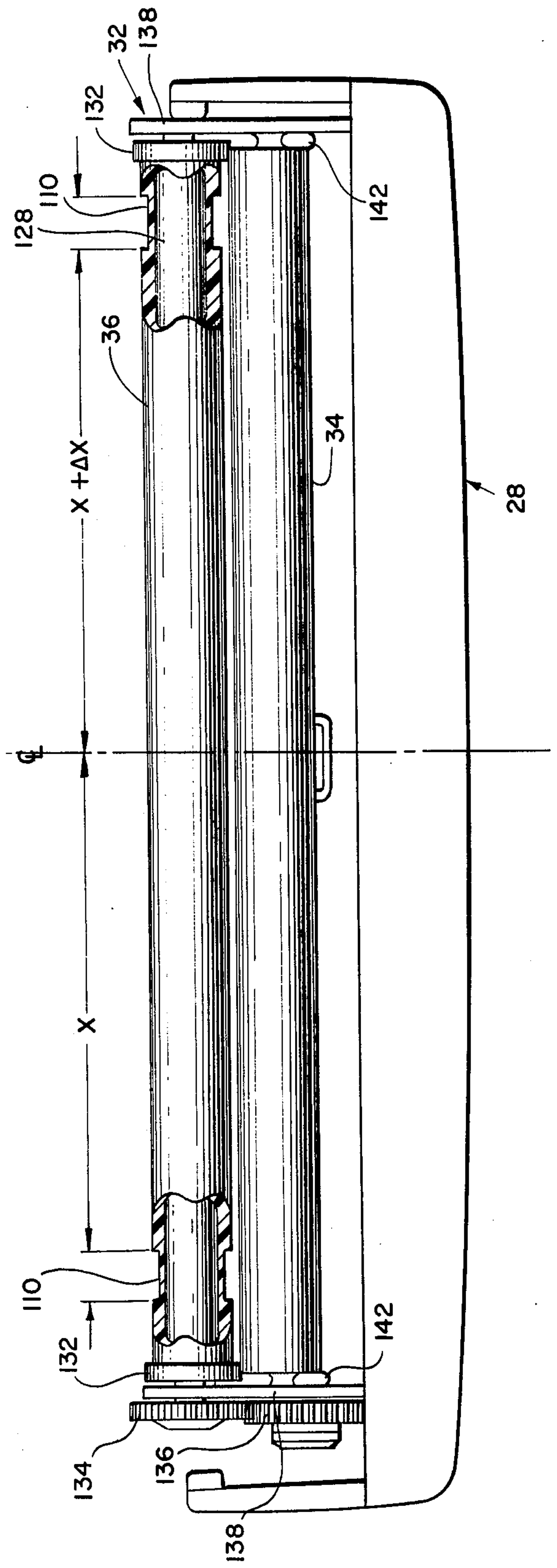
FIG. 11 is a front elevational view of the invention illustrating the asymmetry of its roller grooves.

The other features of the invention will now be discussed. FIG. 11 illustrates the pair of roller members, 34 and 36, of the roller assembly 32. Roller 36 is shown as a substantially cylindrical roller structure including a generally rigid support member 128 made, for example, of stainless steel. Overlying the support member is a layer 130 of a high friction resilient material such as urethane. The annular grooves 110 are plung ground into the layer of urethane 130 after it has been formed over the rigid support member 128. The spacing of the annular grooves 110 with respect to the centerline of the roller assembly 32 is asymmetric as illustrated in this figure. The left groove (facing the system 10) is spaced away from the center line by an experimentally determined distance X, while the right groove is spaced away by the distance, X, plus an experimentally determined increment ΔX. The widths of the annular grooves are equal and each is at least equal to the lateral distance between the respective edges of the inward extensions of the binding 94 on the surface of the sheet elements 86 and 88, i.e., the differences by which the binding 94 on one side of the film unit overlap each other.

In addition, there are a pair of annular collars 132 that are provided on the roller 36 to define a minimum gap between the rollers 34 and 36 to facilitate the introduction of a film unit between them. It is necessary to provide a high friction sheet contacting surface on at least one of the roller surfaces so that the film unit will not slip as it is being driven through the roller assembly 32. In this connection the spreader member 36 constitutes a drive roller in that it has a spur gear 134 which is axially connected to it. The spur gear 134 in turn is coupled to the camera motor through an appropriate gear train, not shown in its entirety, but comprising a pinion 136. The control circuit of the system 10 appropriately initiates rotatory motion of the spreader member 36 prior to the introduction of the film unit 46 into engagement with the roller assembly 32. Since the annular collars 132 contact the surface of the spreader member 34, it, in turn, also rotates at this time thereby facilitating the introduction of the film unit 46 between the rollers 34 and 36 and also as a result insures a smooth progression of the film unit 46 throughout the fluid spreading process. The rollers 34 and 36 as shown in FIG. 11 are rotatably mounted in juxtaposed relationship between a pair of spaced apart support brackets 138. Support brackets 138 have portions defining enlongated slots 140, only one of which is shown in FIG. 2, which permit the roller 34 to be linearly displaced with respect to the roller 36 during the passage of the film unit 46 therebetween. Additionally, a torsion spring 142 resiliently urges the roller 34 toward the roller 36 under a substantially constant load to keep the two rollers in contact when no film unit is between them and also to provide the necessary pressure to spread the processing fluid 92.

The embodiment of the invention described herein is illustrative and not restrictive, the scope of the invention being indicated by the appended claims and all variations which come within the meaning of the claims are intended to be embraced therein.

What is claimed is:

1. Photographic apparatus comprising:

means for locating at least one substantially rectangular flat self-processable film unit in position for exposure, the film unit including a pair of superposed sheet elements, a container of processing fluid positioned adjacent the leading edge of the film unit and a pair of binders respectively overlapping and attached to the longitudinal edges of the superposed sheet elements to hold the superposed sheet elements together along their longitudinal edges, the binders thus being adapted to control the thickness of a layer of the processing fluid progressively spread from the container, under an applied pressure, from the leading edge to the trailing edge of the film unit, the film unit including an exposure area having its lateral width defined by the inwardly facing edges of the binders disposed on one side of the superposed sheet elements, the inwardly facing edges of the binders disposed on the other side of the superposed sheet elements being laterally spaced apart a distance wider than the lateral width of the exposure area of the film unit, the film unit thus being adapted to have the layer of processing fluid spread between its superposed sheets extend laterally beyond its exposure area and beyond portions of its binders, the film apparatus defining a line coinciding with the longitudinal centerline of the film unit when the film unit is disposed in its exposure position by said locating means;

first and second elongated pressure applying members mounted i juxtaposed relationship to define an elongated pressure generating gap extending normal to said line of said apparatus and positioned to receive the leading edge of the film unit as the film unit is advanced leading edge first from its exposure position with the exposure area defining edges of the binders facing said first pressure applying member, said pressure applying member serving to apply a compressive force to the film unit effecting first the release of the processing fluid from its container and then the spreading of the released processing fluid between the superposed sheet elements of the film unit as the film unit is advanced through said pressure generating gap; and means for advancing the film unit leading edge first away from its said exposure position and into said pressure generating gap, said advancing means including means for engaging the film unit adjacent the trailing edge of one of its longitudinal edges causing the leading edge of the film unit to become canted at a predetermined angle with respect to said line of said apparatus as the film unit moves from its exposure position into said pressure generating gap, said first pressure applying member including means for presenting a pair of laterally spaced apart shallow recesses of substantially equal width to the film unit as it is advanced therepast, said recesses being spaced apart along said first pressure applying member such that their inward edges are separated by a distance less than the lateral width of the film unit's exposure area, said width of said recesses being selected such that their outward edges are separated by a distance less than the width of the film unit, said recesses further being arranged laterally along said first pressure applying member to be asymmetrically disposed with respect to said line of said apparatus to respectively progressively receive the entire length of the exposure area defining edges of the binders as the film unit moves through said pressure generating gap while portions of the film unit binders overlying both sides of the longitudinal edge portions of the film unit's juxtaposed sheet elements being continually disposed between said pressure applying members exteriorly of said recesses at such times and thereby function in combination with the longitudinal edges of the superposed film unit sheets respectively disposed therebetween to space said pressure applying members away from one another as the film unit moves through said pressure generating gap with the processing fluid, as it is released from its container, spreading between th film unit's superposed sheets underneath and laterally beyond the exposure area defining edges of the binding.

2. The apparatus of claim 1 wherein said juxtaposed pressure applying members comprise a pair of rollers and additionally including actuable means for driving at least one of said rollers to effect the advancement of the film unit through said pressure generating gap.

3. The apparatus of claim 1 wherein said shallow recesses are asymmetrically positioned lengthwise of said first pressure applying member.

* * * * *